(12) United States Patent
Kim et al.

(10) Patent No.: US 11,964,858 B2
(45) Date of Patent: Apr. 23, 2024

(54) PALLET LOADING APPARATUS AND PALLET LOADING METHOD

(71) Applicants: Hyundai Motor Company, Seoul (KR); Kia Corporation, Seoul (KR)

(72) Inventors: Joohan Kim, Suwon-si (KR); Youngjin Jung, Cheonan-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 450 days.

(21) Appl. No.: 17/357,332

(22) Filed: Jun. 24, 2021

(65) Prior Publication Data
US 2022/0089419 A1    Mar. 24, 2022

(30) Foreign Application Priority Data

Sep. 23, 2020   (KR) .......................... 10-2020-0122929

(51) Int. Cl.
*B66F 9/06* (2006.01)
*B66F 9/075* (2006.01)
*G05D 1/00* (2006.01)

(52) U.S. Cl.
CPC ............ *B66F 9/063* (2013.01); *B66F 9/0755* (2013.01); *G05D 1/024* (2013.01)

(58) Field of Classification Search
CPC .......... B66F 9/063; B66F 9/0755; B66F 9/20; B66F 9/07581; G05D 1/024;
(Continued)

(56) References Cited

U.S. PATENT DOCUMENTS

| 6,456,910 | B1 * | 9/2002 | Roe ...................... | G05D 1/0206 |
| | | | | 701/400 |
| 2005/0095114 | A1 * | 5/2005 | Jenkins ................ | B65G 57/302 |
| | | | | 414/788.1 |

(Continued)

FOREIGN PATENT DOCUMENTS

| CN | 111242041 A | * | 6/2020 | ......... G06K 9/00791 |
| JP | 2018058679 A | * | 4/2018 | |
| KR | 20110027460 A | | 3/2011 | |

OTHER PUBLICATIONS

English Translation of CN 111242041 A (Year: 2023).*
English Translation of JP2018058679A (Year: 2023).*

*Primary Examiner* — Rami Khatib
*Assistant Examiner* — Shahira Baajour
(74) *Attorney, Agent, or Firm* — Slater Matsil, LLP

(57) ABSTRACT

An embodiment pallet stacking apparatus includes a lidar installed in an unmanned forklift and configured to radiate laser light and convert range data reflected from a first cup-feet pallet to 3D point cloud data, a bird's eye view (BEV) conversion unit configured to convert the 3D point cloud data to a 2D BEV image, a cup recognition unit configured to perform channel normalization with input data of the 2D BEV image and recognize a cup position through calculation using convolutional neural network, a forklift controller configured to control operation of the unmanned forklift according to a control signal, and a control unit configured to identify a difference between a cup position of the first cup-feet pallet and a cup position of a stationary second cup-feet pallet and apply a control signal for adjustment to a matching position to the forklift controller.

20 Claims, 11 Drawing Sheets

(58) Field of Classification Search
CPC ......... G05D 2201/0216; G05D 1/0225; G05D 1/0246; G05D 1/0257; G06T 7/20; G06T 7/30; G06T 2207/10028; G06T 2207/20084

See application file for complete search history.

(56) References Cited

U.S. PATENT DOCUMENTS

| | | | |
|---|---|---|---|
| 2015/0347840 A1* | 12/2015 | Iida | G06T 7/593 |
| | | | 382/103 |
| 2017/0246744 A1* | 8/2017 | Chitta | B25J 9/1687 |
| 2018/0081369 A1 | 3/2018 | Fischer et al. | |
| 2018/0089517 A1 | 3/2018 | Douglas et al. | |
| 2020/0109038 A1* | 4/2020 | Nagasawa | G06T 7/70 |
| 2021/0035057 A1* | 2/2021 | Jacobus | G06Q 10/087 |
| 2021/0380310 A1* | 12/2021 | Asami | B66F 9/0755 |

* cited by examiner

PALLET LOADING APPARATUS AND PALLET LOADING METHOD

CROSS-REFERENCE TO RELATED APPLICATIONS

This application claims the benefit of Korean Patent Application No. 10-2020-0122929, filed in the Korean Intellectual Property Office on Sep. 23, 2020, which application is hereby incorporated herein by reference.

TECHNICAL FIELD

The present invention relates to a pallet stacking apparatus and a pallet stacking method.

BACKGROUND

In general, factory or industry sites use standard pallets for logistics transport of goods or component parts. When a plurality of items are loaded on a flat upper surface, a fork of a forklift is inserted into a space formed under the flat upper surface of the standard pallet, and then the standard pallet is transferred to a desired place.

Meanwhile, recently, an unmanned forklift is being operated to transfer items within the factory to realize a smart factory, and pallet recognition technology is being developed for autonomy of the transfer of items.

However, cup-feet pallets other than the standard pallet are frequently used in the field, and therefore, it will be advantageous when a pallet stacking apparatus and a pallet stacking method applicable for the cup-feet pallets are provided.

The above information disclosed in this Background section is only for enhancement of understanding of the background of the invention, and therefore it may contain information that does not form the prior art that is already known to a person of ordinary skill in the art.

SUMMARY

An exemplary pallet stacking apparatus includes a lidar installed in an unmanned forklift and configured to radiate laser light and convert range data reflected from a cup-feet pallet to 3D point cloud data, a bird's eye view (BEV) conversion unit configured to convert the 3D point cloud data to a 2D BEV image, a cup recognition unit configured to perform channel normalization with input data of the converted 2D BEV image and recognize a cup position through calculation using convolutional neural network (CNN), a forklift controller configured to control operation of the unmanned forklift according to a control signal, and a control unit configured to identify a difference between a cup position of a first cup-feet pallet loaded on a fork of the unmanned forklift and a cup position of a stationary second cup-feet pallet and apply a control signal for adjustment to a matching position to the forklift controller.

The exemplary pallet stacking apparatus may further include a communication unit configured to receive a transfer work instruction including at least one of a pallet ID, a transfer destination, a travel route, and to stack or not, from a server.

The lidar may be installed at the fork and configured to vary a vertical position according to raising or lowering operation of the fork.

The BEV conversion unit may be configured to generate the 2D BEV image by decreasing a height H value among a length L, a width W, and a height H of the 3D point cloud data.

The BEV conversion unit may be configured to generate a 2D BEV image of an upper cup or a 2D BEV image of a lower cup based on the upper cup or the lower cup of the cup-feet pallet, by decreasing the height H value.

The BEV conversion unit may be configured to differently convert the 2D image generated for different height H values, through projection after translational movement, rotation, and size adjustment depending on an angle of the lidar.

The cup recognition unit may be configured to obtain the image region recognized as the cup in the 2D BEV image of a quadrangular boundary through image feature extraction and classification using the CNN, and identify a central point of the image region as the cup position.

The forklift controller may be configured to measure a distance between the cup position and the fork, and control the unmanned forklift to lift up the first cup-feet pallet by the fork.

The forklift controller may be configured to match the cup position of the first cup-feet pallet loaded on the fork with a behavior coordinate system for a posture control of the fork and temporarily store the matched coordinates and vary the cup position according to the behavior of the unmanned forklift and raising or lowering control of the fork.

The control unit may be configured to measure a horizontal distance d1, a vertical distance d2, and a misaligned angle $\theta$ between a position of an upper cup of the second cup-feet pallet and a position of a lower cup of the first cup-feet pallet.

The control unit may be configured to, when the horizontal distance d1, the vertical distance d2, and the misaligned angle $\theta$ do not satisfy a preset matching condition, apply a control signal to the forklift controller in a closed-loop control method.

The control unit may be configured to, when the horizontal distance d1, the vertical distance d2, and the misaligned angle $\theta$ do not satisfy a preset matching condition, apply a control signal to the forklift controller in a closed-loop control method.

The control unit may be configured to, when a matching condition of the horizontal distance d1 and the vertical distance d2 being within 20 mm and the misaligned angle $\theta$ being within 2° is satisfied, transmit a fork lowering signal to the forklift controller to finally load the cup-feet pallets in multi-stages.

An exemplary pallet stacking method of a pallet stacking apparatus installed in an unmanned forklift includes transferring a to-be-transferred first cup-feet pallet loaded on a fork of the unmanned forklift to a destination, radiating laser light by using a lidar and converting range data reflected from a stationary second cup-feet pallet to 3D point cloud data, converting the 3D point cloud data to a 2D bird's-eye view (BEV) image, performing channel normalization with input data of the 2D BEV image and recognizing a cup position through calculation using convolutional neural network (CNN), identifying a difference between a cup position of a first cup-feet pallet loaded on the fork and a cup position of a stationary second cup-feet pallet, and applying a control signal for adjustment to a matching position to a forklift controller that controls the operation of the unmanned forklift.

The identifying the difference may include calculating a horizontal distance d1, a vertical distance d2, and a misaligned angle θ as a directional deviation between the position of the upper cup of the second cup-feet pallet and the position of the lower cup of the first cup-feet pallet.

The applying the control signal may include controlling the unmanned forklift to adjust the position of the fork in a closed-loop control method when the horizontal distance d1, the vertical distance d2, and the misaligned angle θ do not satisfy the matching condition.

The applying the control signal may include stacking the first cup-feet pallet on the second cup-feet pallet by transmitting a control signal for lowering the fork to the forklift controller, when the horizontal distance d1, the vertical distance d2, and the misaligned angle θ satisfy the matching condition.

The exemplary pallet stacking method may further include, before the transferring the to-be-transferred first cup-feet pallet, collecting range data reflected from the first cup-feet pallet, converting the range data to a 2D BEV image, and recognizing the cup position of the first cup-feet pallet through calculation utilizing the CNN.

The transferring the to-be-transferred first cup-feet pallet may include matching the cup position of the first cup-feet pallet loaded on the fork with a behavior coordinate system for a posture control of the fork and temporarily storing the matched coordinates, and varying the cup position according to the behavior of the unmanned forklift and raising or lowering control of the fork.

An exemplary server for controlling stacking of cup-feet pallets by an unmanned forklift operated in a production factory includes a lidar signal collection unit configured to collect range data reflected from a cup-feet pallet from an infrastructure lidar and convert the range data to a 3D point cloud data, a bird's-eye view (BEV) conversion unit configured to convert the 3D point cloud data to a 2D BEV image, a cup recognition unit configured to perform channel normalization with input data of the 2D BEV image and recognize a cup position through calculation using convolutional neural network (CNN), a forklift management unit configured to collect status information to track a position and operation status of the unmanned forklift, a transmission/reception unit connected to the unmanned forklift through wireless communication to collect the status information and configured to transmit a control signal for transfer and stacking of the cup-feet pallet, and a central processing unit configured to identify a difference between a cup position of a first cup-feet pallet loaded on a fork of the unmanned forklift and a cup position of a stationary second cup-feet pallet and transmit a control signal for adjustment to a matching position to the unmanned forklift through the transmission/reception unit.

According to an exemplary embodiment, point cloud data of the cup-feet pallet obtained using a lidar is converted to a BEV image, and thereby the cup positions may be precisely recognized.

In addition, through the function of recognizing cup positions of the pallet, transfer of items through cup-feet pallets and multi-stage stacking of cup-feet pallets may be automated by utilizing an unmanned forklift.

In addition, since a smart factory may be realized by autonomous transfer of items by utilizing an unmanned forklift, the effect of reducing factory operation and labor costs may be expected.

Figure 1:
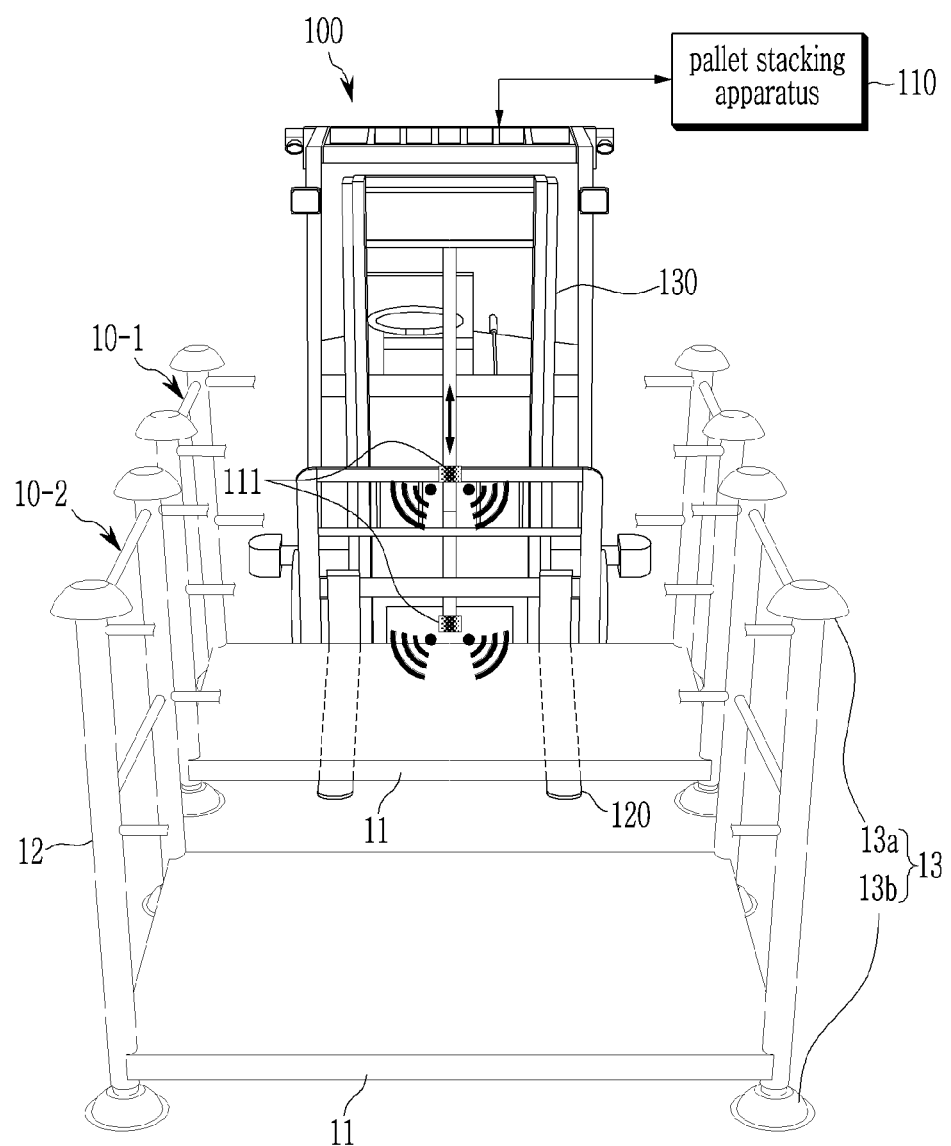
FIG. 1 illustrates an unmanned forklift applied with a pallet stacking apparatus according to an exemplary embodiment.

The following elements may be used in connection with the drawings to describe embodiments of the present invention.

| | |
|---|---|
| 10: cup-feet pallet | 11: pallet |
| 12: supporting member | 13: cup |
| 13a: upper cup | 13b: lower cup |
| 100: unmanned forklift | 110: pallet stacking apparatus |
| 111: lidar | 112: BEV conversion unit |
| 113: cup recognition unit | 114: forklift controller |
| 115: communication unit | 116: control unit |
| 120: fork | 130: lifting device |
| 200: server | |

DETAILED DESCRIPTION OF ILLUSTRATIVE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and the nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

The terms used herein are used only for the purpose of describing particular exemplary embodiments and are not intended to limit the present invention. Singular expressions include plural expressions unless clearly described as different meanings in the context.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, pails, or combinations thereof.

Unless otherwise defined herein, all terms including technical or scientific terms used herein have the same meaning as commonly understood by one of ordinary skill in the art to which the present invention belongs. Terms such as those defined in a commonly used dictionary should be interpreted as being consistent with the meaning in the context of the related technology, and are not interpreted in an ideal or excessively formal meaning unless explicitly defined in the present specification.

Hereinafter, a pallet stacking apparatus and a pallet stacking method according to an exemplary embodiment are described in detail with reference to the drawings.

FIG. 1 illustrates an unmanned forklift applied with a pallet stacking apparatus according to an exemplary embodiment.

Figure 2:
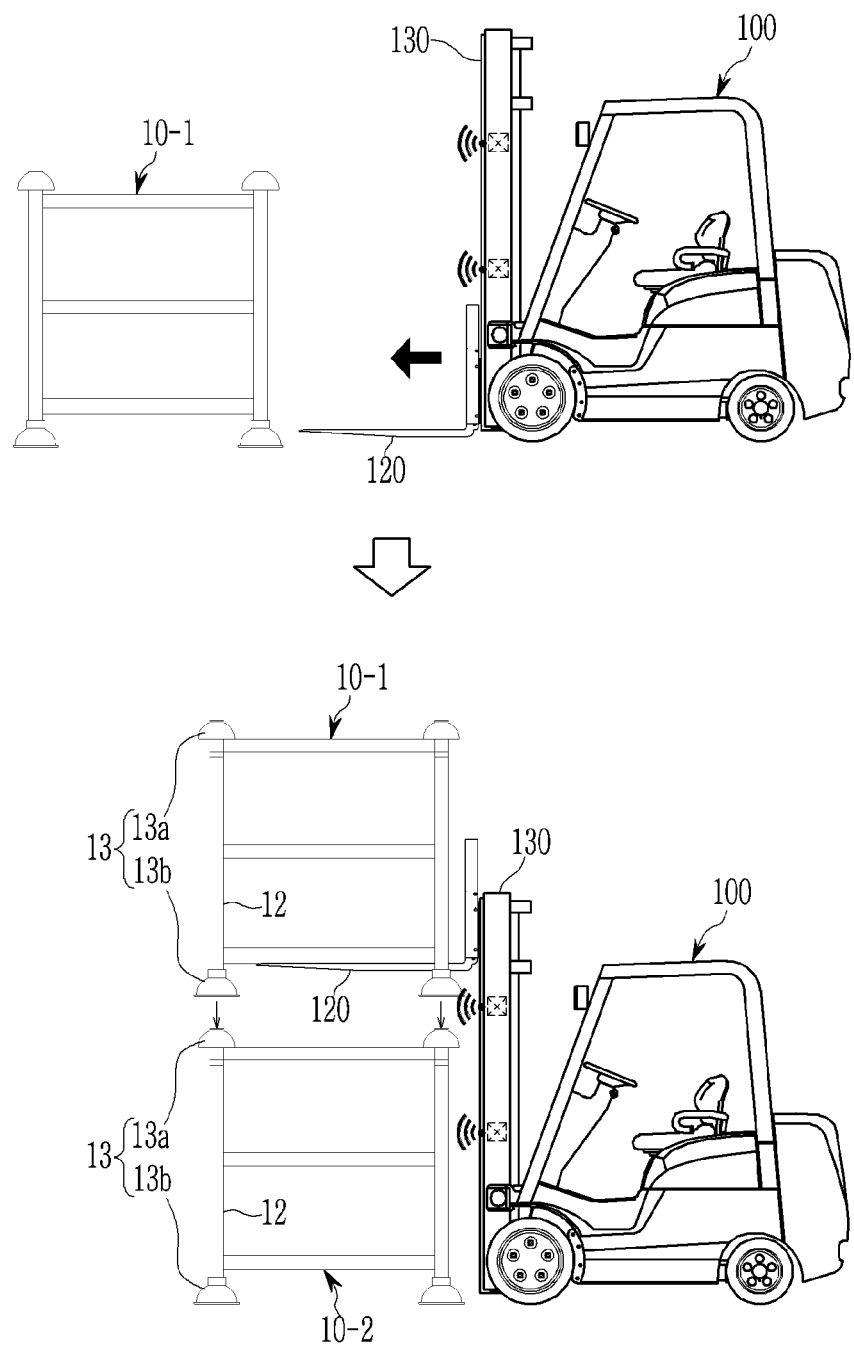
FIG. 2 illustrates a process of stacking cup-feet pallets by an unmanned forklift according to an exemplary embodiment.

FIG. 2 illustrates a process of stacking cup-feet pallets by an unmanned forklift according to an exemplary embodiment.

Referring to FIG. 1 and FIG. 2, an unmanned forklift 100 according to an exemplary embodiment is an autonomous forklift that is configured to lift and transfer a cup-typed pallet (hereinafter, called a "cup-feet pallet") 10 by using a pallet stacking apparatus no, a fork 120 and a lifting device 130, without manual operation of a human operator. Alternatively, the unmanned forklift 100 may be an unmanned transfer robot, for example, an autonomous mobile robot (AMR) or an automated guided vehicle (AGV), that is provided with the fork 120 and the lifting device 130 to transfer the pallets.

The pallet stacking apparatus no is installed in the unmanned forklift 100.

Cup-feet pallets for transfer of various component parts are frequently used in a vehicle production factory built as a smart factory.

The cup-feet pallet 10 includes a pallet plate 11 for loading items, a supporting member 12 disposed at each vertex of the pallet plate 11, and cups 13 formed at top and bottom positions of the supporting member 12.

The cups 13 are formed in a shape of a bowl forming a concave recess, and configured to act as a structural member supporting the supporting member 12. The cups 13 include an upper cup 13a and a lower cup 13b depending on a position relative to the supporting member 12.

A plurality of cup-feet pallets 10 may be stacked by positioning a cup-feet pallet to be transferred such that the lower cup 13b of the cup-feet pallet to be transferred overlaps the upper cup 13a of the stationary cup-feet pallet 10.

Hereinafter, for convenience of description, the pallet to be transferred is called a first cup-feet pallet 10-1 and a stationary pallet over which the pallet to be transferred is to be stacked is called a second cup-feet pallet 10-2.

That is, by the fork 120 and the lifting device 130, the unmanned forklift 100 lifts the first cup-feet pallet 10-1 to be transferred and loads the first cup-feet pallet 10-1 over the stationary second cup-feet pallet 10-2, by positioning four lower cups 13b of the first cup-feet pallet 10-1 on the four upper cups 13a of the stationary second cup-feet pallet 10-2.

At this time, the unmanned forklift 100 may identify the type of the pallet and relative position information between the first cup-feet pallet 10-1 loaded on the fork 120 and the stationary second cup-feet pallet 10-2 through the pallet stacking apparatus 110, and thereby may move and control the lifting device 130.

Figure 3:
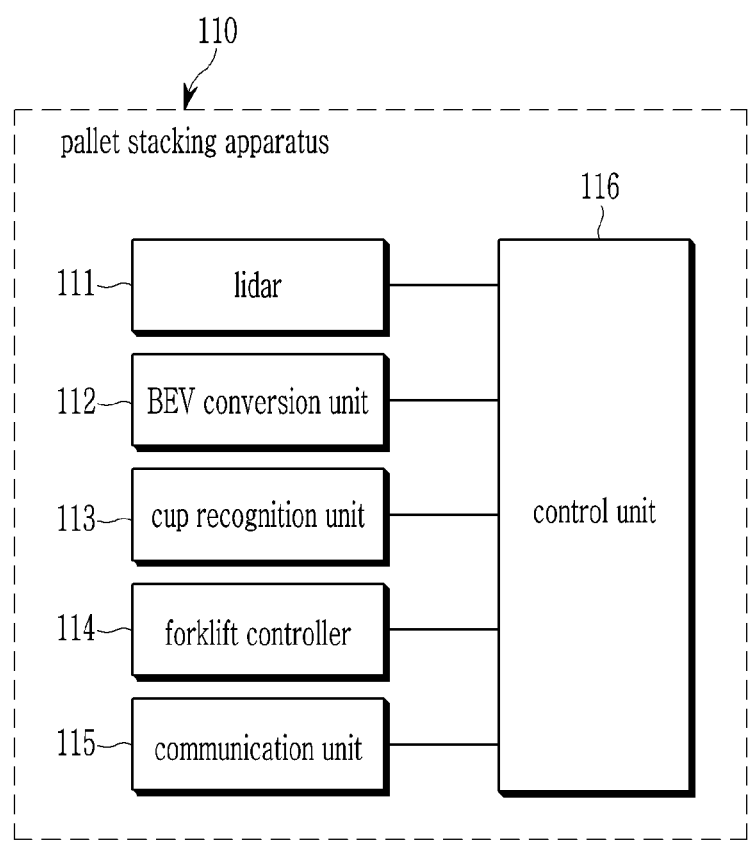
FIG. 3 is a block diagram of a pallet stacking apparatus according to an exemplary embodiment.

FIG. 3 is a block diagram of a pallet stacking apparatus according to an exemplary embodiment.

Referring to FIG. 3, a pallet stacking apparatus no according to an exemplary embodiment includes the lidar 111, a BEV conversion unit 112, a cup recognition unit 113, a forklift controller 114, a communication unit 115 and a control unit 116.

The lidar 111 is configured to radiate laser light and, by measuring the time and intensity of each reflected signal (for example, light), detect distances, directions, speeds, temperature, material distributions, and concentration characteristics of surrounding objects.

The lidar 111 is installed in a frame of the fork 120, and thus may vary its vertical position according to the operation of the fork 120 without a separate lifting device.

In addition, when the first cup-feet pallet 10-1 is loaded on the fork 120, the lidar in's sight may be obstructed. Therefore, in an embodiment, another lidar 111 may be further installed at a bottom center portion of the lifting device 130, to clearly recognize the stationary position of the second cup-feet pallet 10-2.

Figure 4A:
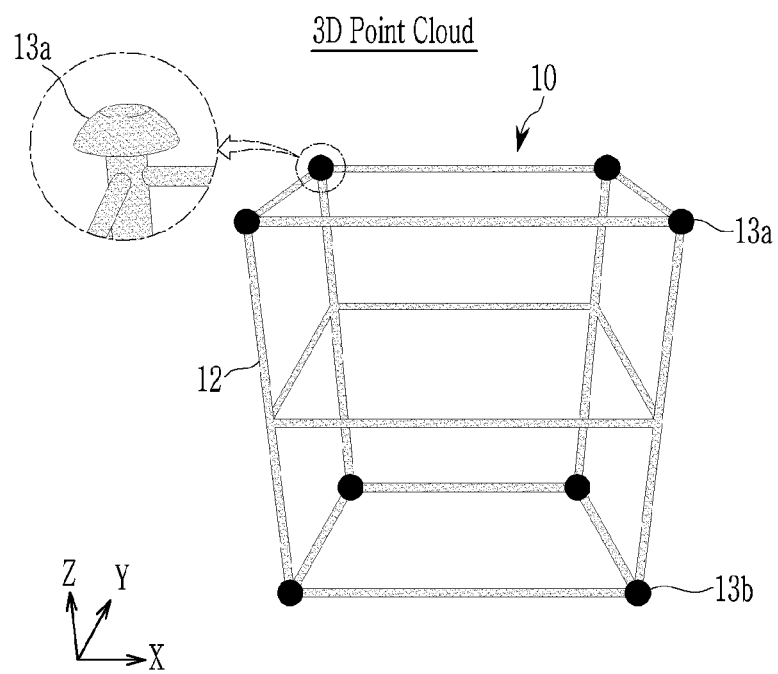
FIG. 4A and FIG. 4B illustrate processing of cup-feet pallet data obtained by lidar according to an exemplary embodiment.
Figure 4B:
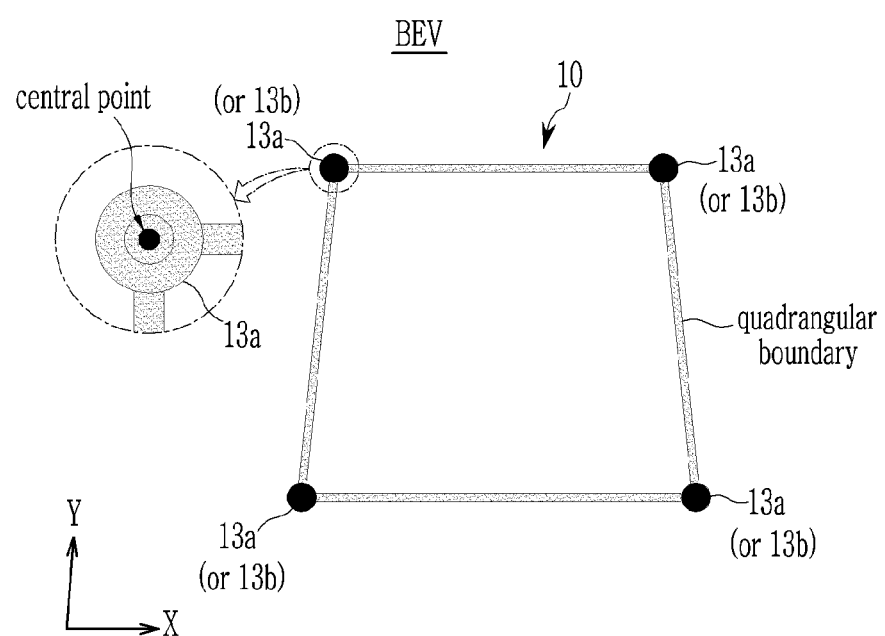

FIG. 4A and FIG. 4B illustrate processing of cup-feet pallet data obtained by lidar according to an exemplary embodiment.

Referring to FIG. 4A, the lidar 111 radiates laser light, collects range data reflected from the cup-feet pallet 10, and converts the range data to 3D point cloud data. The point cloud indicates a set cloud of many points spread over a 3-dimensional space.

Referring to FIG. 4B, the BEV conversion unit 112 is configured to convert the 3D point cloud data of the cup-feet pallet 10 to a 2D bird's-eye view (BEV) image through calculation.

Figure 5:
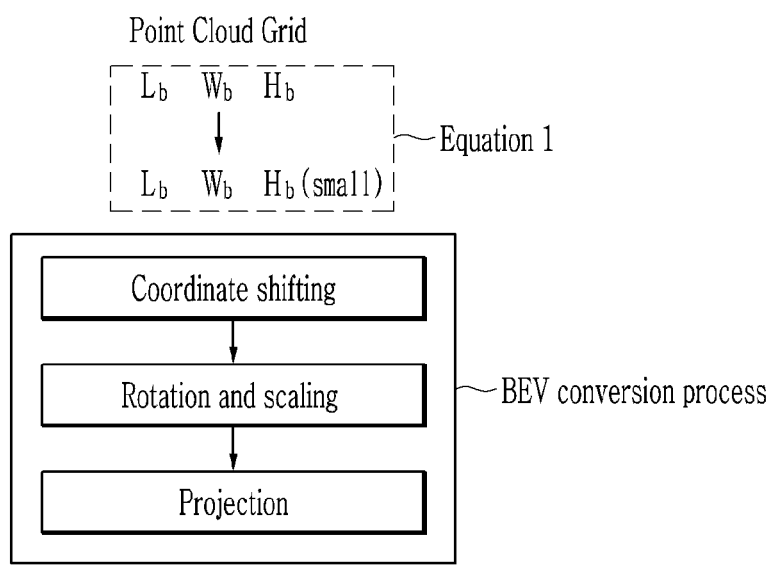
FIG. 5 illustrates conversion from 3D point cloud data to a 2D BEV image according to an exemplary embodiment.

For example, FIG. 5 illustrates conversion from 3D point cloud data to a 2D BEV image according to an exemplary embodiment.

Referring to FIG. 5, equation 1 represents the 3D point cloud data, a grid of each point is expressed as a length L, a width W, and a height H.

The BEV conversion unit 112 generates a 2D BEV image by decreasing the height H value among the length L, the width W, and the height H of the 3D point cloud data. For example, the BEV conversion unit 112 may generate the 2D BEV image, e.g., a 2D BEV image of the upper cup 13a or a 2D BEV image of the lower cup 13b, by decreasing the height H value, based on the upper cup 13a or the lower cup 13b of the cup-feet pallet 10.

In an embodiment, referring to FIG. 4A and FIG. 4B, the 3D point cloud data shown in FIG. 4A may be converted to the 2D BEV image shown in FIG. 4B, by decreasing, e.g., collapsing the height H component (z-axis component in x-y-z coordinate system in FIG. 4A) of the 3D point cloud data shown in FIG. 4A, such that only a 2D image in a bird's eye view may be obtained.

At this time, the BEV conversion unit 112 may differently convert the 2D image, which remains in only x-y coordinates, generated for different height H values (that is, differently for the top and the bottom of the pallet), through projection after translational movement, rotation, and size adjustment depending on an angle of the lidar.

The cup recognition unit 113 performs channel normalization with input data of the converted 2D BEV image, and recognizes the cup position through image feature extraction and classification using the convolutional neural network (CNN), that is, recognizes the cup 13a or 13b from the quadrangular boundary image.

The cup recognition unit 113 may obtain an image region recognized as the cup from the 2D BEV image of the quadrangular boundary, and may recognize a central point as the cup position (refer to FIG. 4B).

In addition, the cup recognition unit 113 stores model and design data for various types of pallets including the cup-feet pallet 10, and is configured to recognize the pallet through image feature extraction and classification based on the CNN of the lidar image.

The forklift controller 114 may control autonomous driving of the forklift to the destination, while detecting surroundings based on a plurality of detection techniques through at least one sensor fusion of a radar, an ultrasonic wave sensor, and a camera as well as the lidar 111.

The forklift controller 114 is configured to control the operation of the lifting device 130 to raise or lower the fork 120 according to a control signal, and form a behavior coordinate system for a posture control of the fork 120.

The behavior coordinate system may be a reference coordinate system appropriately set for analyzing and/or controlling the behavior of the fork 120, for example, an x-y-z coordination system.

The forklift controller 114 is configured to measure a cup position in the 2D BEV recognized through the cup recognition unit 113 and a distance of the fork 120 to the cup position, and to lift up the cup-feet pallet 10 by the fork 120.

The forklift controller 114 is configured to match the cup position of the first cup-feet pallet 10-1 loaded on the fork 120 with the behavior coordinate system and temporarily store the matched coordinates and vary the cup position according to the behavior of the unmanned forklift 100 and raising/lowering control of the fork 120. Through this, the forklift controller 114 may vary the position of the lower cup 13b of the first cup-feet pallet 10-1 loaded on the fork 120 appropriately to the position of the upper cup 13a recognized at the stationary second cup-feet pallet 10-2, and stack the first cup-feet pallet 10-1 on the second cup-feet pallet 10-2.

In addition, the forklift controller 114 may control the driving, steering, shifting, speed, and braking of the unmanned forklift 100 for autonomous driving.

The communication unit 115 may communicate data used to operate the unmanned forklift 100 with a server, for example, a manufacturing execution system (MES), of the production factory through wireless communication.

For example, the communication unit 115 may receive a transfer work instruction, for example, including a pallet ID, a transfer destination, a travel route, to stack or not, and the like, for transfer of component parts for each factory, from the server (MES).

To stack or not may indicate whether the pallet indicated by the pallet ID is to be stacked on another pallet at the destination.

The control unit 116 may be configured as a computing system that is configured to store, in a memory, various programs and data used to operate the unmanned forklift 100 in the production factory, thereby controlling the overall operation of the pallet stacking apparatus 110.

Figure 6:
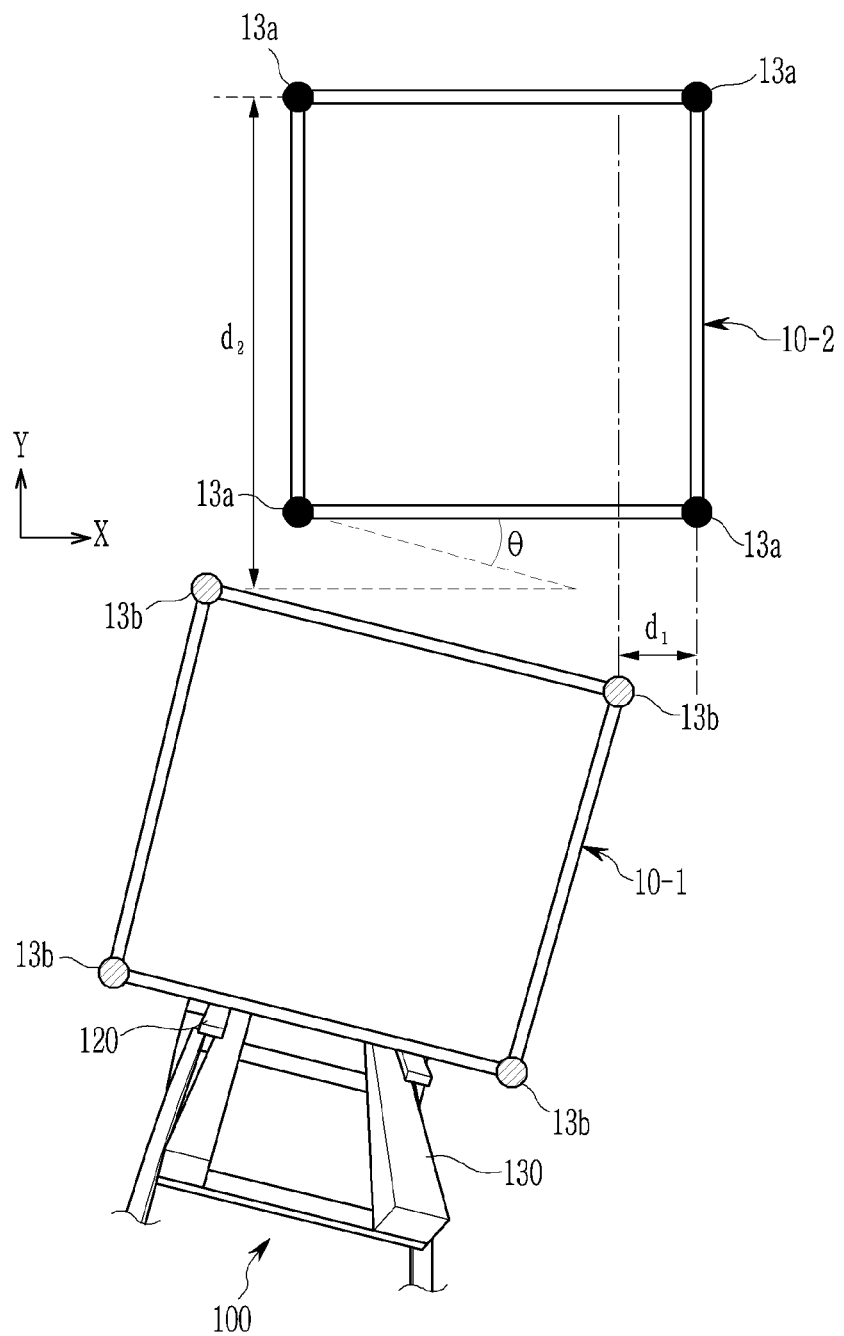
FIG. 6 illustrates stacking cup-feet pallets in multi-stages according to an exemplary embodiment.

FIG. 6 illustrates stacking cup-feet pallets in multi-stages according to an exemplary embodiment.

Referring to FIG. 6, the control unit 116 identifies the position of the lower cup 13b of the first cup-feet pallet 10-1 currently loaded on the fork 120.

The control unit 116 measures the 3D point cloud data of the stationary second cup-feet pallet 10-2 by using the lidar in, and converts the 3D point cloud data to the 2D BEV image, to identify the position of the upper cup 13a from the projected image.

The control unit 116 measures a horizontal distance d1, a vertical distance d2, and a misaligned angle θ as a directional deviation between the position of the upper cup 13a of the second cup-feet pallet 10-2 and the position of the lower cup 13b of the first cup-feet pallet 10-1. Through this, the control unit 116 may generate a control signal to adjust distances d1 and d2 and a misaligned angle θ of the position of the lower cup 13b with respect to the position of the upper cup 13a.

The control unit 116 may control the position adjustment behavior of the unmanned forklift 100 by applying a control signal to the forklift controller 114 such that the position of the upper cup 13a matches the position of the lower cup 13b.

At this time, when the horizontal distance d1, the vertical distance d2, and the misaligned angle θ between the two cup-feet pallets do not satisfy a preset matching condition, the control unit 116 may transmit a control signal to the forklift controller 114 in a closed-loop control method.

Thereafter, when a matching condition of the horizontal distance d1 and the vertical distance d2 being within 20 mm and the misaligned angle θ being within 2° is satisfied, the control unit 116 may transmit a fork lowering signal to the forklift controller 114 to finally load the cup-feet pallets 10 in multi-stages.

For multi-stage stacking of the cup-feet pallets 10, the control unit 116 may be realized as at least one processor operated by a preset program, and the preset program may be programmed to execute steps of a pallet stacking method according to an exemplary embodiment.

Meanwhile, a pallet stacking method according to an exemplary embodiment performed based on the above-described pallet stacking apparatus 110 is hereinafter described in detail with reference to FIG. 7.

In the preceding description, the configuration of the pallet stacking apparatus 110 has been subdivided into each unit for each function for better understanding, but it is obvious that it may be integrated into one pallet stacking apparatus 110.

Figure 7:
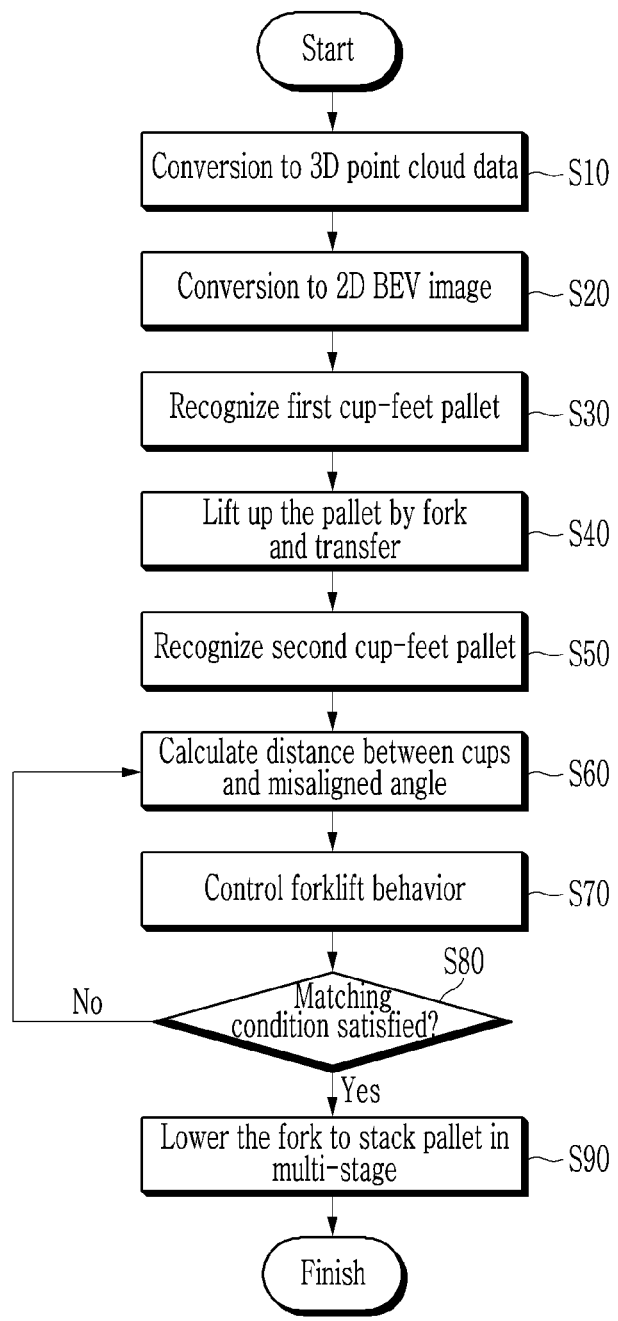
FIG. 7 is a flowchart showing a pallet stacking method according to an exemplary embodiment.
Figure 8:
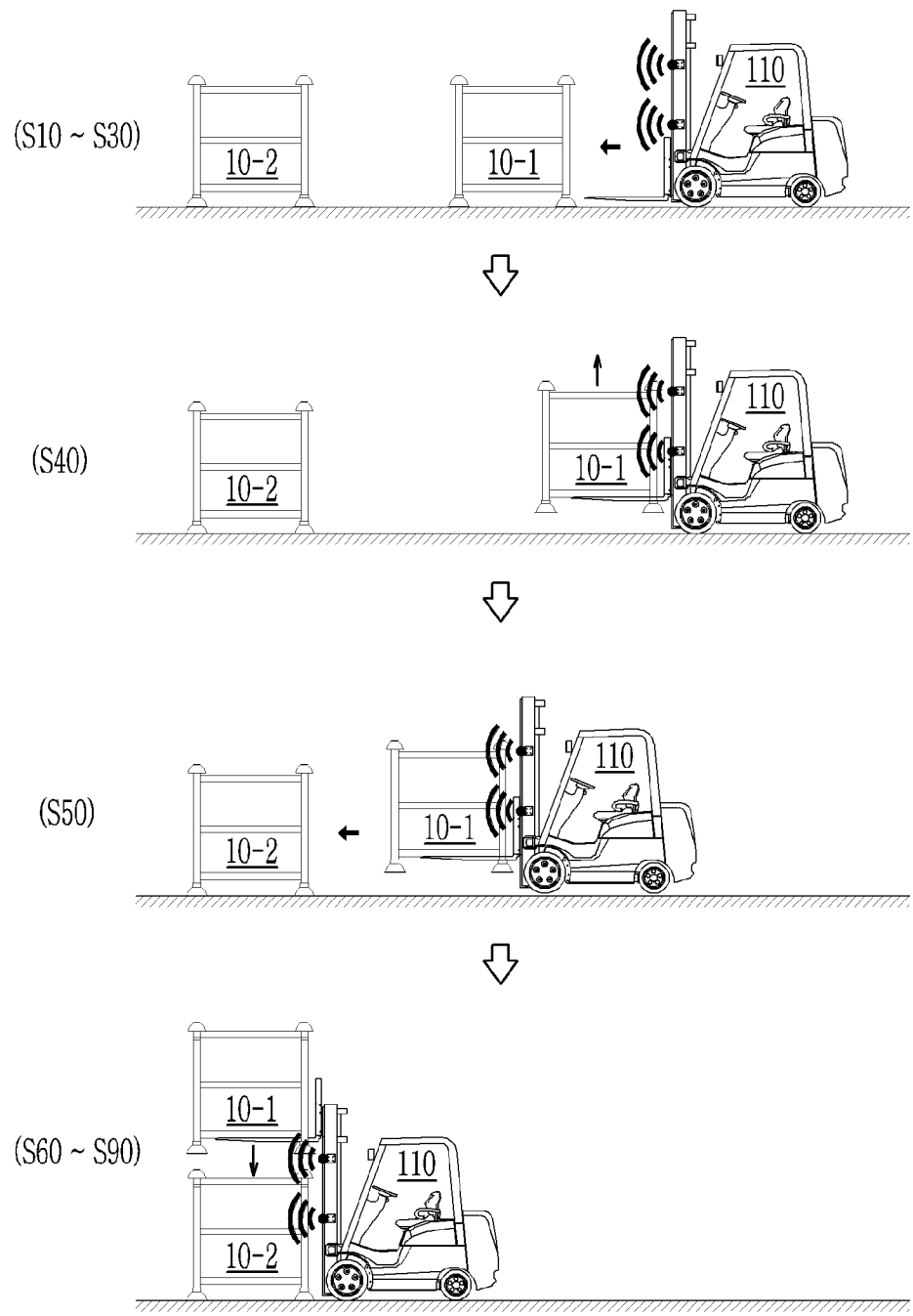
FIG. 8 illustrates steps of the pallet stacking method according to an exemplary embodiment.

FIG. 7 is a flowchart showing a pallet stacking method according to an exemplary embodiment. FIG. 8 illustrates steps of the pallet stacking method according to an exemplary embodiment.

Referring to FIG. 7 and FIG. 8, a pallet stacking apparatus no according to an exemplary embodiment controls autonomous driving of the unmanned forklift 100 to the destination of the first cup-feet pallet 10-1 to be transferred, according to the pallet transfer instruction of a server (MES).

At step S10, the pallet stacking apparatus no radiates the laser light by the lidar 111, collects the range data reflected from the first cup-feet pallet 10-1, and converts the range data to the 3D point cloud data.

At step S20, the pallet stacking apparatus no converts the 3D point cloud data of the first cup-feet pallet 10-1 to a 2D BEV image through calculation.

At step S30, the pallet stacking apparatus no performs channel normalization with input data of the 2D BEV image, and recognizes the lower cup 13b from the quadrangular boundary image of the 2D BEV image through calculation utilizing the CNN. At this time, the pallet stacking apparatus no may extract each central point of the four lower cups 13b to identify positions of the lower cups 13b.

At step S40, the pallet stacking apparatus no aligns the unmanned forklift 100 based on the positions of the lower cups 13b, and lifts up the first cup-feet pallet 10-1 by the fork 120 to transfer the pallet 10-1 to a subsequent destination. At this time, the pallet stacking apparatus no may measure a difference in a distance and a direction (i.e., angle) between the lower cups 13b and the fork 120, and may transmit a control signal to adjust the difference to the forklift controller 114 to align the position of the unmanned forklift 100.

At step S50, the pallet stacking apparatus 110 collects range data reflected from the second cup-feet pallet 10-2 through the lidar 111, and converts the range data to the 2D BEV image, and recognizes positions of the upper cups 13a of the second cup-feet pallet 10-2 through calculation utilizing the CNN. The step S50 is similar to the step S10 to step S30, except that the 2D BEV image is generated with respect to the upper cups 13a of the second cup-feet pallet 10-2 rather than the lower cups 13b of the first cup-feet pallet 10-1.

At step S60, the pallet stacking apparatus no calculates a horizontal distance d1, a vertical distance d2, and a misaligned angle θ as a directional deviation between the position of the upper cup 13a of the second cup-feet pallet 10-2 and the position of the lower cup 13b of the first cup-feet pallet 10-1.

At step S70, the pallet stacking apparatus no controls the behavior (i.e., positions of the fork) of the unmanned forklift 100 by applying a control signal to the forklift controller 114 to match the positions of the lower cups 13b to the positions of the upper cups 13a.

At this time, when the horizontal distance d1, the vertical distance d2, and the misaligned angle θ do not satisfy the matching condition, (S80-No), the pallet stacking apparatus 110 may adjust the position of the fork by controlling the unmanned forklift 100 in a closed-loop control method.

On the other hand, when the horizontal distance d1, the vertical distance d2, and the misaligned angle θ satisfy the matching condition, (S80-Yes), at step S90, the pallet stacking apparatus 110 lowers the fork 120 to stack the first cup-feet pallet 10-1 on the second cup-feet pallet 10-2, to form multi-stage stacking of a plurality of cup-feet pallets 10.

As such, according to an exemplary embodiment, point cloud data of the cup-feet pallet obtained using a lidar is converted to a BEV image, and thereby the cup positions may be precisely recognized.

In addition, through the function recognizing cup positions of the pallet, transfer of items through cup-feet pallets and multi-stage stacking of cup-feet pallets may be automated by utilizing an unmanned forklift.

In addition, since a smart factory may be realized by autonomous transfer of items by utilizing an unmanned forklift, the effect of reducing factory operation and labor costs may be expected.

It may be understood that the present invention is not limited to the specific embodiments disclosed above, and variations may be available.

For example, in the above exemplary embodiments, the pallet stacking apparatus 110 is configured to recognize the cup-feet pallet 10 by utilizing the lidar 111 installed in the unmanned forklift 100. However, it may be understood that the present invention is not limited thereto. A server that operates infrastructure lidars disposed region by region of the production factory may calculate cup-feet pallet position information, and one or more unmanned forklifts 100 may be controlled based on such calculated cup-feet pallet position information.

Figure 9:
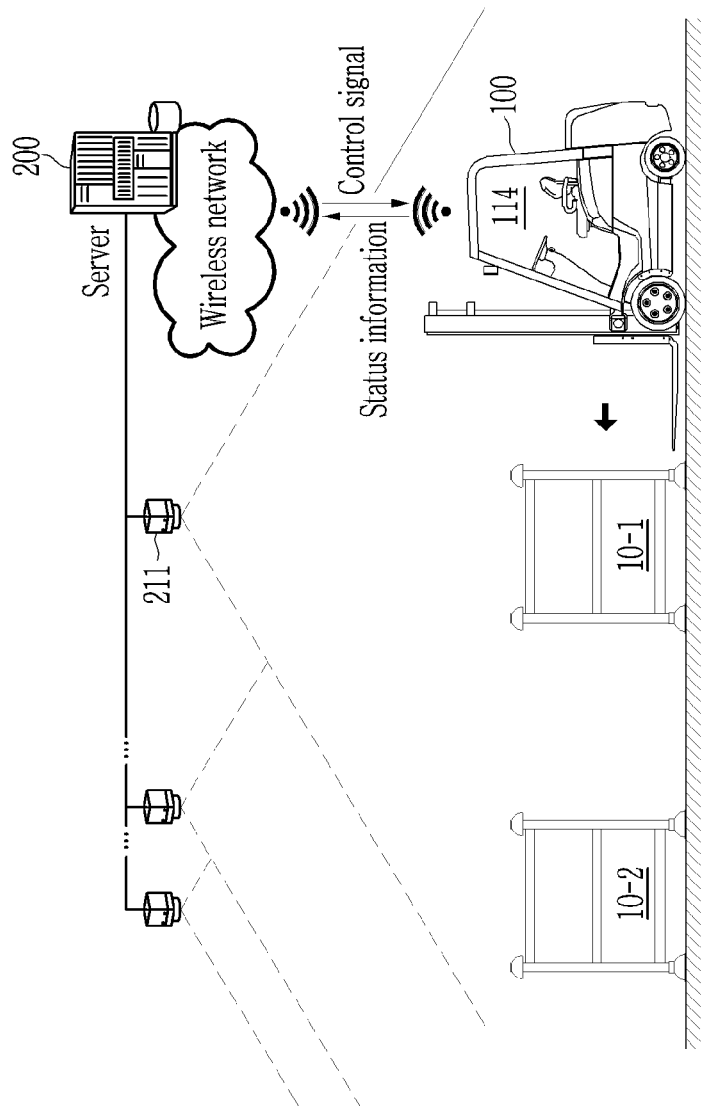
FIG. 9 illustrates a pallet stacking system according to another exemplary embodiment.

For example, FIG. 9 illustrates a pallet stacking system according to another exemplary embodiment.

Figure 10:
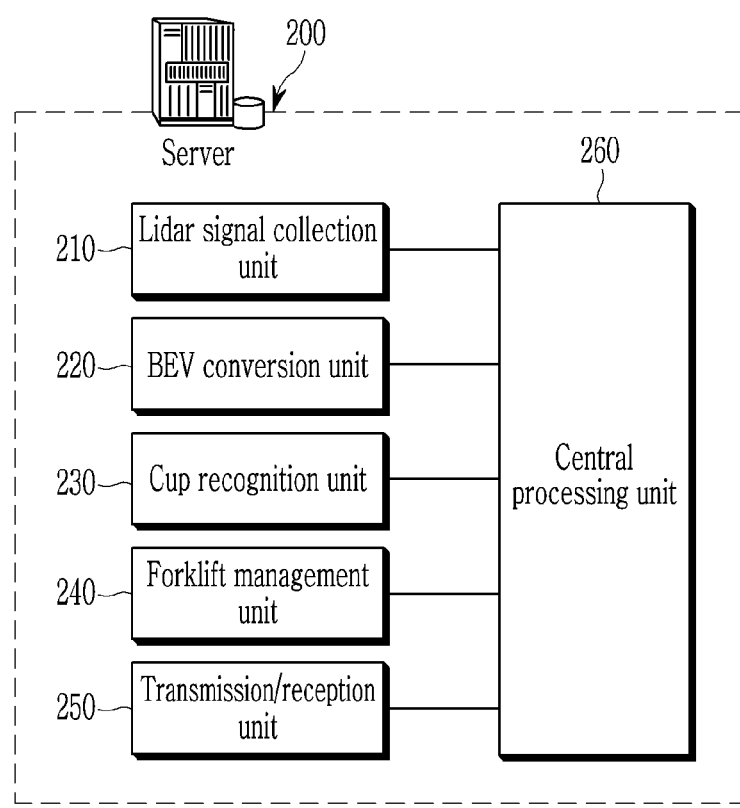
FIG. 10 is a block diagram of a server according to another exemplary embodiment.

FIG. 10 is a block diagram of a server according to another exemplary embodiment.

Referring to FIG. 9 and FIG. 10, a pallet stacking system according to another exemplary embodiment includes the unmanned forklift 100, an infrastructure lidar 211, and a server 200. In comparison with the above exemplary embodiments, the server 200 is employed for the pallet stacking apparatus, and the following description will be focused on differences.

The unmanned forklift 100 includes the forklift controller 114 and the communication unit 115, without including the lidar 111, the BEV conversion unit 112, the cup recognition unit 113, and the control unit 116 included in the pallet stacking apparatus 110.

Therefore, the forklift controller 114 may control the operation of transfer and stacking of the cup-feet pallet 10, according to a control signal received from the server 200 through the communication unit 115.

The infrastructure lidars 211 may be disposed in each region of the production factory, for example, at a ceiling structural member, and may transmit the lidar signal received in the detection area to the server 200.

The server 200 includes a lidar signal collection unit 210, a BEV conversion unit 220, a cup recognition unit 230, a forklift management unit 240, a transmission/reception unit 250 and a central processing unit 260.

The lidar signal collection unit 210 collects range data reflected from the cup-feet pallet 10 from the infrastructure lidar 211, and converts the collected range data to 3D point cloud data.

For the BEV conversion unit 220 and the cup recognition unit 230, the description of the BEV conversion unit 112 and the cup recognition unit 113 may be referred to.

The forklift management unit 240 registers the unmanned forklift ID of the unmanned forklifts 100 operated in the production factory, and collects status information for each, to track the position and operation status of each unmanned forklift 100.

The transmission/reception unit 250 is connected to the unmanned forklift 100 through wireless communication to collect the status information, and transmits a control signal for transfer and stacking of the cup-feet pallet 10.

The central processing unit 260 may be configured to store, in a database, various programs and data used to operate the unmanned forklift 100 in the production factory, thereby remotely controlling the overall operation of the unmanned forklift 100.

The central processing unit 260 may be configured to query and select the unmanned forklift 100 to the forklift management unit 240, and transmit a transfer work instruction, for example, including a pallet ID, a transfer destination, a travel route, to stack or not, and the like, to control the unmanned forklift 100.

The central processing unit 260 is configured to identify a difference between a cup position of the first cup-feet pallet 10-1 loaded on the fork 120 of the unmanned forklift 100 and a cup position of the stationary second cup-feet pallet 10-2, and to transmit a control signal for adjustment to a matching position to the unmanned forklift 100 through the transmission/reception unit 250.

At this time, the central processing unit 260 measures, by using the infrastructure lidar 211, the horizontal distance d1, the vertical distance d2 and the misaligned angle θ of the quadrangular boundary between the position of the upper cup 13a of the stationary second cup-feet pallet 10-2 and the position of the lower cup 13b of the first cup-feet pallet 10-1. In addition, the central processing unit 260 may transmit a control signal for adjusting the horizontal distance d1, the vertical distance d2, and the misaligned angle θ to the forklift controller 114, and when a matching condition is satisfied, may lower the first cup-feet pallet 10-1 to stack the first cup-feet pallet 10-1 on the second cup-feet pallet 10-2 to achieve multi-stage stacking.

In addition, the central processing unit 260 may perform the same control function of the control unit 116 described in the previous exemplary embodiment remotely through a wireless network, and centrally control and monitor pallet transfer and stacking operations of each unmanned forklift ID.

As a result, component part cost may be reduced by omitting the configuration of the pallet stacking apparatus for each unmanned forklift, recognition information of the cup-feet pallet may be centrally processed, and thereby, operation of the unmanned forklift may become fully autonomous.

The exemplary embodiments of the present invention described above are not only implemented by the apparatus and the method, but may be implemented by a program for realizing functions corresponding to the configuration of the embodiments of the present invention or a recording medium on which the program is recorded.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A pallet stacking apparatus comprising:
   a lidar installed in an unmanned forklift and configured to radiate laser light and convert range data reflected from a first cup-feet pallet to 3D point cloud data;
   a forklift controller configured to control operation of the unmanned forklift;
   at least one processor;
   non-transitory computer readable medium storing program code that, when executed by the at least one processor, causes the at least one processor to:
   convert the 3D point cloud data to a 2D BEV image;
   perform channel normalization with input data of the 2D BEV image and recognize a cup position of the first cup-feet pallet through calculation using convolutional neural network (CNN);
   measure a horizontal distance, a vertical distance, and a misaligned angle between a position of an upper cup of a second cup-feet pallet and a position of a lower cup of the first cup-feet pallet;
   identify a difference between the position of the upper cup of the second cup-feet pallet and the position of the lower cup of the first cup-feet pallet; and
   apply a control signal for adjustment to a matching position between the first cup-feet pallet and the second cup-feet pallet to the forklift controller on a fork of the unmanned forklift.

2. The pallet stacking apparatus of claim 1, wherein the pallet stacking apparatus is configured to receive a transfer work instruction including at least one of a pallet ID, a transfer destination, a travel route, or to stack or not instruction.

3. The pallet stacking apparatus of claim 1, wherein the lidar is installed at the fork so that a vertical position of the lidar will vary according to a raising or lowering operation of the fork.

4. The pallet stacking apparatus of claim 1, wherein the forklift controller is configured to measure a distance between the cup position and the fork and control the unmanned forklift to lift up the first cup-feet pallet by the fork.

5. The pallet stacking apparatus of claim 1, wherein the forklift controller is configured to match coordinates of the cup position of the first cup-feet pallet loaded on the fork with a coordinate system for a posture control of the fork and temporarily store the coordinates and vary the cup position according to a behavior of the unmanned forklift and raising or lowering control of the fork.

6. The pallet stacking apparatus of claim 1, wherein the program code causes the at least one processor to generate the control signal to adjust the horizontal distance, the vertical distance, and the misaligned angle of the lower cup with respect to the upper cup.

7. The pallet stacking apparatus of claim 1, wherein the program code causes the at least one processor to, when the horizontal distance, the vertical distance, and the misaligned angle do not satisfy a preset matching condition, apply the control signal to the forklift controller in a closed-loop control method.

8. The pallet stacking apparatus of claim 1, wherein the program code causes the at least one processor to, when a matching condition of the horizontal distance and the vertical distance being within 20 mm and the misaligned angle being within 2° is satisfied, transmit a fork lowering signal to the forklift controller to load the cup-feet pallets in multi-stages.

9. A pallet stacking apparatus comprising:
   a lidar installed in an unmanned forklift and configured to radiate laser light and convert range data reflected from a first cup-feet pallet to 3D point cloud data;
   a forklift controller configured to control operation of the unmanned forklift;
   at least one processor;
   non-transitory computer readable medium storing program code that, when executed by the at least one processor, causes the at least one processor to:
   convert the 3D point cloud data to a 2D BEV image by decreasing a height measurement value among a length, a width, and a height of the 3D point cloud data;
   perform channel normalization with input data of the 2D BEV image and recognize a cup position of the first cup-feet pallet through calculation using a convolutional neural network (CNN);

identify a difference between the cup position of the first cup-feet pallet loaded on a fork of the unmanned forklift and a cup position of a stationary second cup-feet pallet; and apply a control signal for adjustment to a matching position between the first cup-feet pallet and the second cup-feet pallet to the forklift controller.

10. The pallet stacking apparatus of claim 9, wherein the program code causes the at least one processor to generate a 2D BEV image of an upper cup or a 2D BEV image of a lower cup based on the upper cup or the lower cup of the first cup-feet pallet, respectively, by decreasing the measurement value.

11. The pallet stacking apparatus of claim 9, wherein the program code causes the at least one processor to differently convert the 2D BEV image generated for different measurement values through projection after translational movement, rotation, and size adjustment depending on an angle of the lidar.

12. A pallet stacking apparatus comprising:
a lidar installed in an unmanned forklift and configured to radiate laser light and convert range data reflected from a first cup-feet pallet to 3D point cloud data;
a forklift controller configured to control operation of the unmanned forklift;
at least one processor;
non-transitory computer readable medium storing program code that, when executed by the at least one processor, causes the at least one processor to:
convert the 3D point cloud data to a 2D BEV image;
perform channel normalization with input data of the 2D BEV image;
obtain an image region recognized as a cup in the 2D BEV image of a quadrangular boundary through image feature extraction and classification using a convolutional neural network (CNN); and
recognize a cup position of the first cup-feet pallet through the CNN by identifying a central point of the image region as the cup position;
identify a difference between the cup position of the first cup-feet pallet loaded on a fork of the unmanned forklift and a cup position of a stationary second cup-feet pallet; and
apply a control signal for adjustment to a matching position between the first cup-feet pallet and the second cup-feet pallet to the forklift controller.

13. The pallet stacking apparatus of claim 12, wherein the lidar is installed at the fork so that a vertical position of the lidar will vary according to a raising or lowering operation of the fork.

14. The pallet stacking apparatus of claim 12, wherein the forklift controller is configured to measure a distance between the cup position and the fork and control the unmanned forklift to lift up the first cup-feet pallet by the fork.

15. The pallet stacking apparatus of claim 12, wherein the forklift controller is configured to match coordinates of the cup position of the first cup-feet pallet loaded on the fork with a coordinate system for a posture control of the fork and temporarily store the coordinates and vary the cup position according to a behavior of the unmanned forklift and raising or lowering control of the fork.

16. A method of operating an unmanned forklift, the method comprising:
transferring a first cup-feet pallet loaded on a fork of the unmanned forklift to a destination;
radiating laser light by using a lidar;
converting range data reflected from a stationary second cup-feet pallet to 3D point cloud data;
converting the 3D point cloud data to a 2D bird's-eye view (BEV) image;
performing channel normalization with input data of the 2D BEV image;
recognizing a cup position of the second cup-feet pallet through calculation using convolutional neural network (CNN);
identifying a difference between a cup position of the first cup-feet pallet loaded on the fork and the cup position of the stationary second cup-feet pallet, wherein identifying the difference comprises calculating a horizontal distance, a vertical distance, and a misaligned angle as a directional deviation between a position of an upper cup of the second cup-feet pallet and a position of a lower cup of the first cup-feet pallet; and
adjusting a position of the fork so that the cup position of the first cup-feet pallet matches the cup position of the stationary second cup-feet pallet.

17. The method of claim 16, wherein adjusting the position of the fork comprises controlling the unmanned forklift to adjust the position of the fork in a closed-loop control method when the horizontal distance, the vertical distance, and the misaligned angle do not satisfy a matching position where the cup position of the first cup-feet pallet matches the cup position of the stationary second cup-feet pallet.

18. The method of claim 16, further comprising lowering the fork when the horizontal distance, the vertical distance, and the misaligned angle satisfy a matching position where the cup position of the first cup-feet pallet matches the cup position of the stationary second cup-feet pallet.

19. The method of claim 16, further comprising, before transferring the first cup-feet pallet:
collecting range data reflected from the first cup-feet pallet;
converting the range data to a second 2D BEV image; and
recognizing the cup position of the first cup-feet pallet through calculation utilizing the CNN.

20. The method of claim 19, wherein transferring the first cup-feet pallet comprises:
matching coordinates of the cup position of the first cup-feet pallet loaded on the fork with a behavior coordinate system for a posture control of the fork and temporarily storing the coordinates; and
varying the cup position of the first cup-feet pallet according to a behavior of the unmanned forklift and raising or lowering control of the fork.

* * * * *

UNITED STATES PATENT AND TRADEMARK OFFICE
CERTIFICATE OF CORRECTION

PATENT NO. : 11,964,858 B2
APPLICATION NO. : 17/357332
DATED : April 23, 2024
INVENTOR(S) : Kim et al.

It is certified that error appears in the above-identified patent and that said Letters Patent is hereby corrected as shown below:

In the Claims

In Column 12, in Claim 9, Line 61:
Change "decreasing a height measurement value" to "decreasing a measurement value"

Signed and Sealed this
Eleventh Day of June, 2024

Katherine Kelly Vidal
*Director of the United States Patent and Trademark Office*